Figure 1:
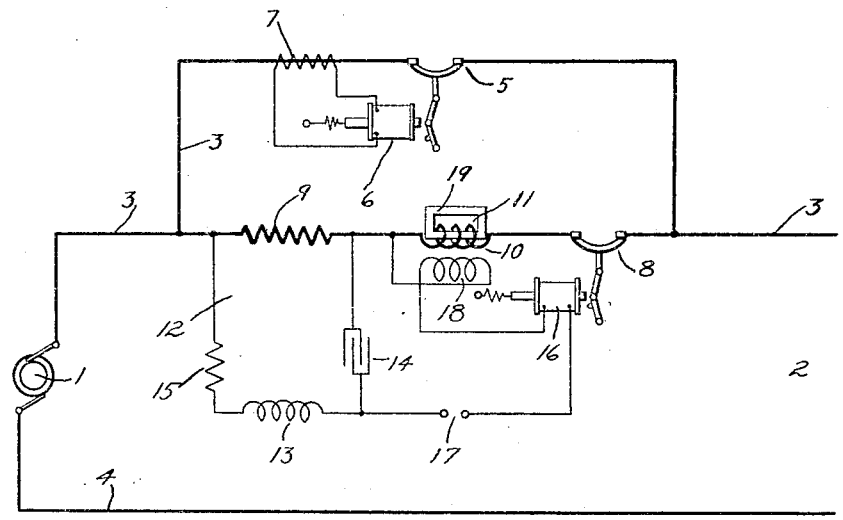

L. W. CHUBB.
CIRCUIT INTERRUPTING SYSTEM.
APPLICATION FILED JULY 5, 1917.

1,287,233.

Patented Dec. 10, 1918.

WITNESSES:
T. R. Krear.
J. H. Procter

INVENTOR
Lewis. W. Chubb
BY
Cleesley G. Carr
ATTORNEY

UNITED STATES PATENT OFFICE.

LEWIS W. CHUBB, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING SYSTEM.

1,287,233.  Specification of Letters Patent.  Patented Dec. 10, 1918.

Application filed July 5, 1917. Serial No. 178,674.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Circuit-Interrupting Systems, of which the following is a specification.

My invention relates to circuit interrupting systems, and particularly to circuit interrupters that are adapted to open at the zero value only of the current wave traversing the same.

One object of my invention is to provide a circuit interrupter of the above indicated character, that shall have means for energizing its trip coil when a current wave having a predetermined effective value passes through its zero value to permit the circuit interrupter to be so timed in its operation that it will be opened at a time corresponding to a predetermined number of half cycles from the time its trip coil is energized.

Another object of my invention is to provide means for a circuit interrupter of the above indicated character that shall be adapted to so peak the potential wave impressed across the trip coil circuit at its maximum value that the trip coil will be energized only at the maximum value of the potential wave impressed thereacross and, consequently, at the zero value of the current wave traversing the circuit.

My copending application Serial No. 95,053, filed May 3, 1916, discloses a resonant or tuned device that is connected to a main circuit for so controlling the trip coil of a circuit interrupter that it will be energized a sufficient time interval before the instantaneous value of the current having a predetermined overload value passes through its zero value to permit the interrupter to open only when no current traverses the same. The trip coil is connected in series relation to a spark gap and the circuit, thus constituted, is connected across the condensive element of the resonant circuit. Thus, when the potential across the trip coil circuit that corresponds to the break-down value of the spark gap is reached and this break-down value corresponds to the maximum value of the current wave, the current wave will be passing through its zero value, and, consequently, the trip coil will be energized when the current wave passes through its zero value. Means is provided for so advancing the phase-angular relation between the potential of the condensive element of the resonant circuit and the remaining portion of the resonant circuit that the maximum value of the voltage wave across the condensive element of the circuit occurred an interval of time before the zero value in the other element of the circuit that corresponded to the time required for the circuit interrupter to operate.

Since the resonant current through the resonant circuit of the above indicated device builds up with a logarithmic increment, it is likely that the spark voltage of the spark gap will be higher than that reached in one cycle of this increasing voltage. Thus, the spark gap will not break down before the peak or maximum value of the succeeding cycle. In view of this, I provide an impulse transformer having a normally saturated core member. The transformer is connected between the main circuit and the circuit comprising the spark gap and the trip coil. The sudden change of flux at the zero value in the current in the main circuit induces an impulse voltage and since this impulse voltage is superposed upon the main voltage across the spark gap, the voltage across the spark gap will break down at its maximum value only. That is, the maximum value of the current flowing during at least one cycle corresponds to the break-down value of the spark gap. The time of operation of the interrupter is so adjusted that it will operate to open the circuit in a time that corresponds to an integral number of half cycles after the spark gap breaks down, thus causing the circuit to be opened at zero value of the current wave under all conditions.

Figure 2:
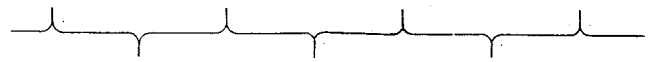
Figure 3:
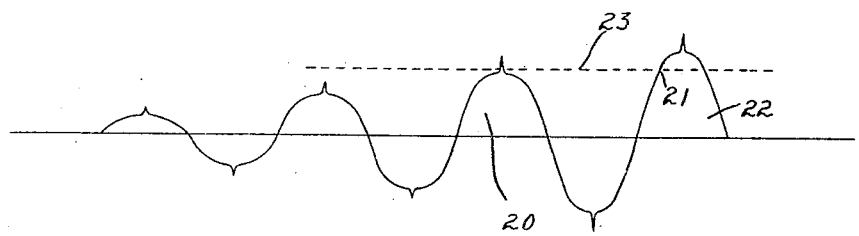

In the accompanying drawings Figure 1 is a diagrammatic view of an electric circuit embodying my invention; Fig. 2 is a diagram illustrating the voltage peaks induced by the transformer shown in Fig. 1, and Fig. 3 is a diagram illustrating the change in the potential wave that is effected by the use of my invention.

A generator 1 supplies current to a circuit 2 comprising conductors 3 and 4. A circuit interrupter 5 is connected in circuit with the conductor 3 of the circuit 2 for the purpose of opening the same when the current reaches a predetermined value. The circuit interrupter 5 is provided with a trip coil 6 that is energized through a series transformer 7 from the circuit 2. A second interrupter 8 is connected in series with a non-inductive resistor 9 and the primary winding 10 of a transformer 11 and the circuit, thus constituted, is connected in shunt relation to the circuit interrupter 5. While I have shown the circuit interrupters 5 and 8 as connected in only one conductor of the circuit 2, it will, of course, be understood that both conductors of the circuit may be protected in the same manner.

A series resonant circuit 12 comprising a reactor 13, a condenser 14 and a resistor 15 is connected in shunt relation to the resistor 9. A trip coil 16 is connected in series relation to a spark gap 17 and the secondary winding 18 of the transformer 11 and the circuit, thus constituted, is connected in shunt relation to the condenser 14.

The transformer 11 is provided with a magnetizable core member 19 that is normally saturated. The primary winding 10 of the transformer 11 has a relatively few number of turns and the secondary winding 18 has a relatively large number of turns.

When an abnormal current traverses the conductors 3 and 4, sufficient current is induced in the transformer 7 and, consequently, the trip coil 6 to trip the circuit interrupter 5 which, on opening, causes the current to traverse the resistor 9, the winding 10 of the transformer 11 and the interrupter 8. The resistor 9 and the winding 10 tend to reduce the current and since the reactor 13, condenser 14 and resistor 15 are of such values that they constitute a resonant circuit for the normal frequency of the generator 1, the resonant current through the circuit 12 will build-up with a logarithmic increment.

If the voltage required to break down the spark gap 17 is higher than that reached in any one cycle, as, for instance, the cycle indicated at 20 in Fig. 3 of the drawings, it will not spark but may break down at the point 21 on the succeeding cycle 22 before the maximum value of the cycle 22 is reached. That is, the broken line 23 of the diagram shown in Fig. 3 of the drawings represents the break-down voltage of the spark gap 17 and thus illustrates a condition under which the trip coil 16 will be energized at a value other than its maximum value. Since the potential across the condenser 14 is in quadrature with the potential across the resistor 9 and the maximum value of the potential wave impressed upon the condenser 14 occurs at the instant of zero value of the current in the resistor 9, it is only necessary to provide some means, such as the transformer 11, that automatically induces an impulse of voltage when the main current passes through its zero value to cause the impulse to be effective at the maximum value of the potential across the condenser 14. That is, the transformer 11 is provided with a saturated core member 19 that inherently causes an impulse of voltage to be superposed on the condenser voltage when the current traversing the resistor 9 and the interrupter 8 is zero and reversing. The diagram in Fig. 2 illustrates the impulse voltage that is induced in the secondary winding 18 of the transformer 11.

Since the secondary winding 18 of the transformer 11 is connected in series with the trip coil 16 and the spark gap 17, the impulse voltage is added to the main voltage across the condenser 14 and thus the voltage across the condenser 14 will assume values shown in Fig. 3 when the same is building up.

When the maximum value of the voltage across the condenser 14 is peaked, as illustrated in Fig. 3 of the drawings, it will be seen that when the voltage wave passes through the cycle, as indicated at 20, the spark gap 17 will break down and the trip coil 16 will be so energized as to trip the circuit interrupter 8. The time required for the interrupter 8 to open after its trip coil 16 is energized corresponds to the time of an integral number of half cycles from the break down of the spark gap 17. Thus, since the break down of the spark gap 17 occurs at the maximum value of the potential across the condenser 14 and, consequently, at the zero value of the current traversing the interrupter 8, and since the interrupter 8 is opened in a time that is an integral number of the half cycles from the time that the spark gap 17 breaks down, it is assured that the circuit is interrupted at the zero value only of the current wave traversing the same.

While I have described my invention with respect to the tripping of a circuit interrupter when the instantaneous value of current traversing it is zero, I do not limit my invention to the particular arrangement illustrated as many modifications may be used without departing from the spirit and scope of the invention as set forth in the appended claims.

I claim as my invention:

1. In an electric circuit, the combination with a circuit interrupter, a series-resonant circuit and a trip coil connected across a portion of the resonant circuit and adapted to be energized under predetermined conditions of the current traversing the electric circuit, of means for inducing an impulse voltage on the voltage wave across a portion of the resonant circuit as its maximum value.

2. In an electric circuit, the combination with a circuit interrupter, a trip coil therefor and means for energizing the trip coil under predetermined conditions of current in the circuit, of means for so peaking the voltage wave in the trip coil circuit that the trip coil is energized only at the zero value of the current wave in the electric circuit.

3. The combination with an alternating-current circuit, a circuit interrupter, a trip coil and means for energizing the trip coil when a predetermined maximum voltage is impressed thereacross, of means connected in the circuit for peaking the voltage wave in the trip coil circuit at its maximum value only.

4. In an electric circuit, the combination with two parallel-connected circuit interrupters, and means for tripping one interrupter under predetermined load conditions in the circuit, of means for subsequently tripping the other interrupter at the zero value of the current wave in the circuit.

5. The combination with an alternating-current circuit, of means for producing a voltage drop therein, a resonant circuit connected so that said voltage drop is impressed thereon, means for inductively deriving an electromotive force from said main circuit, means for superposing said electromotive force upon the voltage across one of the members of said resonant circuit, whereby the wave form of said voltage is modified, and means for utilizing the resultant wave.

6. The combination with an alternating-current circuit, of means for producing a voltage drop therein, a resonant circuit connected so that said voltage drop is impressed thereon, means for inductively deriving an impulse electromotive force from said main circuit, means for superposing said impulse electromotive force upon the voltage across one of the members of said resonant circuit, whereby the wave form of said voltage is modified, and means for utilizing the resultant wave.

7. In an electric circuit, the combination with a series-resonant circuit, and a trip coil and a spark gap connected in shunt relation to the condensive element of the resonant circuit, of means for peaking the voltage wave across one element of the resonant circuit at a predetermined phase position.

8. In an electric circuit, the combination with a circuit interrupter, a trip coil therefor, and a series-resonant circuit operatively connected between the electric circuit and the trip coil, of means for peaking the voltage wave across one element of the resonant circuit under predetermined conditions.

9. In an electric circuit, the combination with a circuit interrupter, a trip coil therefor, and a series-resonant circuit operatively connected between the electric circuit and the trip coil, of an inductive means connected in the circuit for peaking the voltage wave across one element of the resonant circuit at its maximum value.

10. In an electric circuit, the combination with an electro-responsive device, a spark gap connected in series therewith and a series-resonant circuit connected between the electric circuit and the circuit comprising the electro-responsive device, of a transformer connected between the electric circuit and the circuit comprising the electro-responsive device to peak the voltage wave across the circuit comprising the electro-responsive device at its maximum value.

11. In an electric circuit, the combination with a circuit interrupter, a trip coil therefor, a spark gap connected in series with the trip coil, and a series-resonant circuit connected between the trip coil and the electric circuit, of means connected between the circuit and the spark gap to cause the spark gap to break down only when the current wave traversing the circuit passes through its zero value.

12. In an electric circuit, the combination with a circuit interrupter, a trip coil therefor, a spark gap connected in series with the trip coil, and a series-resonant circuit connected between the trip coil and the electric circuit, of a normally saturated transformer connected between the circuit and the spark gap to cause the spark gap to break down only when the current wave traversing the circuit passes through its zero value.

13. In an electric circuit, the combination with a main circuit interrupter, of an auxiliary circuit comprising a circuit interrupter and a current-limiting means connected in shunt relation to the main interrupter, and means for tripping the auxiliary circuit interrupter at the zero value of the current wave traversing the same after the main interrupter is opened.

In testimony whereof, I have hereunto subscribed my name this 27th day of June, 1917.

LEWIS W. CHUBB.

Copies of this patent may be obtained for five cents each, by addressing the "Commissioner of Patents, Washington, D. C."